United States Patent [19]
Patten

[11] 3,772,859
[45] Nov. 20, 1973

[54] SEED HARVESTING APPARATUS

[76] Inventor: Lawson L. Patten, 235 Valdosta Rd., Lakeland, Ga. 31635

[22] Filed: Apr. 26, 1972

[21] Appl. No.: 247,650

[52] U.S. Cl. .............................. 56/13.2, 56/DIG. 8
[51] Int. Cl. ............................................. A01d 45/00
[58] Field of Search .................. 56/12.9, 13.1, 13.2, 56/DIG. 8, 130, 129, 128

[56] References Cited
UNITED STATES PATENTS

| | | | |
|---|---|---|---|
| 1,418,476 | 6/1922 | Schaefer | 56/12.9 |
| 1,844,750 | 2/1932 | Ellis | 56/13.1 |
| 2,637,965 | 5/1953 | Simpson et al. | 56/12.9 |
| 3,193,995 | 7/1965 | Miller | 56/12.9 |
| 2,352,854 | 7/1944 | Miller | 56/13.2 |
| 2,721,655 | 10/1955 | Pritchett | 56/DIG. 8 |

*Primary Examiner*—Antonio F. Guida
*Attorney*—Edward Taylor Newton et al.

[57] ABSTRACT

A header attachment for a self-propelled combine having threshing means wherein the header attachment includes an input feed conveyor housing having an end discharge opening which is adapted to be connected in flow communication with the combine threshing means. The header attachment includes an endless conveyor supported in the input feed conveyor housing for advancing material received through an entrance opening along an upwardly inclined housing bottom for discharge through end discharge opening into the combine threshing means. The header attachment includes rotary flail means having a plurality of flail elements operable for severing and transferring a crop to be harvested to an elevated position. Pneumatic transfer means is operatively associated with the rotary flail gathering means for transferring the severed crop from the gathering means to a cyclone separator means. The cyclone separator means includes a bottom discharge opening connected in flow communication with the input feed conveyor housing for discharging the severed crop into the input feed conveyor housing.

10 Claims, 4 Drawing Figures

PATENTED NOV 20 1973

SEED HARVESTING APPARATUS

BACKGROUND OF THE INVENTION

This invention relates to apparatus for use in harvesting grass seed, such as centipede, and is more particularly concerned with a grass seed harvesting attachment for use with a self-propelled combine.

Grass seed, such as centipede, is easily dislodged from the growing grass in a harvesting operation and is difficult to harvest. The conventional self-propelled combine includes conventional threshing and cleaning means capable of separating the seeds from the plant and includes a number of header attachments which are designed for harvesting grain crops, such as wheat, oats and barley or for harvesting corn and a number of other row planted crops. However, these attachments used for harvesting grain and row planted crops are not satisfactory for harvesting grass seed, such as centipede, since these header attachments will not efficiently sever and transfer the grass and seed to the threshing mechanism of the combine.

A number of attempts have been made to provide seed harvesting equipment which would efficiently gather grass seed, such as centipede. However, the prior art harvesting attachments specifically designed for harvesting grass seed normally include some type of gathering means for severing the crops and include pneumatic means for transferring the severed crop to bagging means. The crop and seed contained in the bagging means must then be transferred to separate threshing equipment which will thresh and separate the seed from the grass.

There have been some attempts to make a complete seed harvesting apparatus which would include gathering means, threshing and separating. However, these specialized prior art seed harvesting apparatuses cannot be used for other crop harvesting operations and are impractical to construct and utilize.

SUMMARY OF THE INVENTION

The above disadvantages have been overcome by the present invention which basically includes a seed harvesting attachment which can be easily connected to a conventional self-propelled combine having threshing and separating means.

One important feature of the present invention is the provision of a flail gathering means which includes means for developing vacuum means over the flail means to ensure maximum collection of grass and seed in a harvesting operation.

Another feature of the present invention is the utilization of an upwardly inclined conveyor housing having a discharge opening adapted to be connected in flow communication with the conventional entrance opening adjacent the threshing cylinder on a self-propelled combine.

A further feature of the present invention includes transfer means operable for transferring grass and seed from the gathering means to the upwardly inclined input feed conveyor means.

It is therefore a primary object of the present invention to provide a seed harvesting attachment for use with a conventional self-propelled combine which is capable of threshing grass seed, such as centipede, but is not capable of harvesting such seed.

A further object of the present invention is to provide a grass seed harvesting attachment which can be readily connected and disconnected with conventional combine attachment means.

Another object of the present invention is to provide a grass seed harvest attachment for a combine which can be adjusted in a vertical plane during a seed harvesting operation.

An additional object of the present invention is to provide a seed harvesting attachment for a self-propelled combine which is simple in construction and use, economical to manufacture and reliable in performance.

These and other objects and advantages of the details of construction will become apparent after reading the following description of the illustrative embodiment, with reference to the attached drawings wherein like reference numerals have been used to refer to like parts throughout the several figures, and wherein:

DESCRIPTION OF THE ILLUSTRATIVE EMBODIMENT

Figure 2:
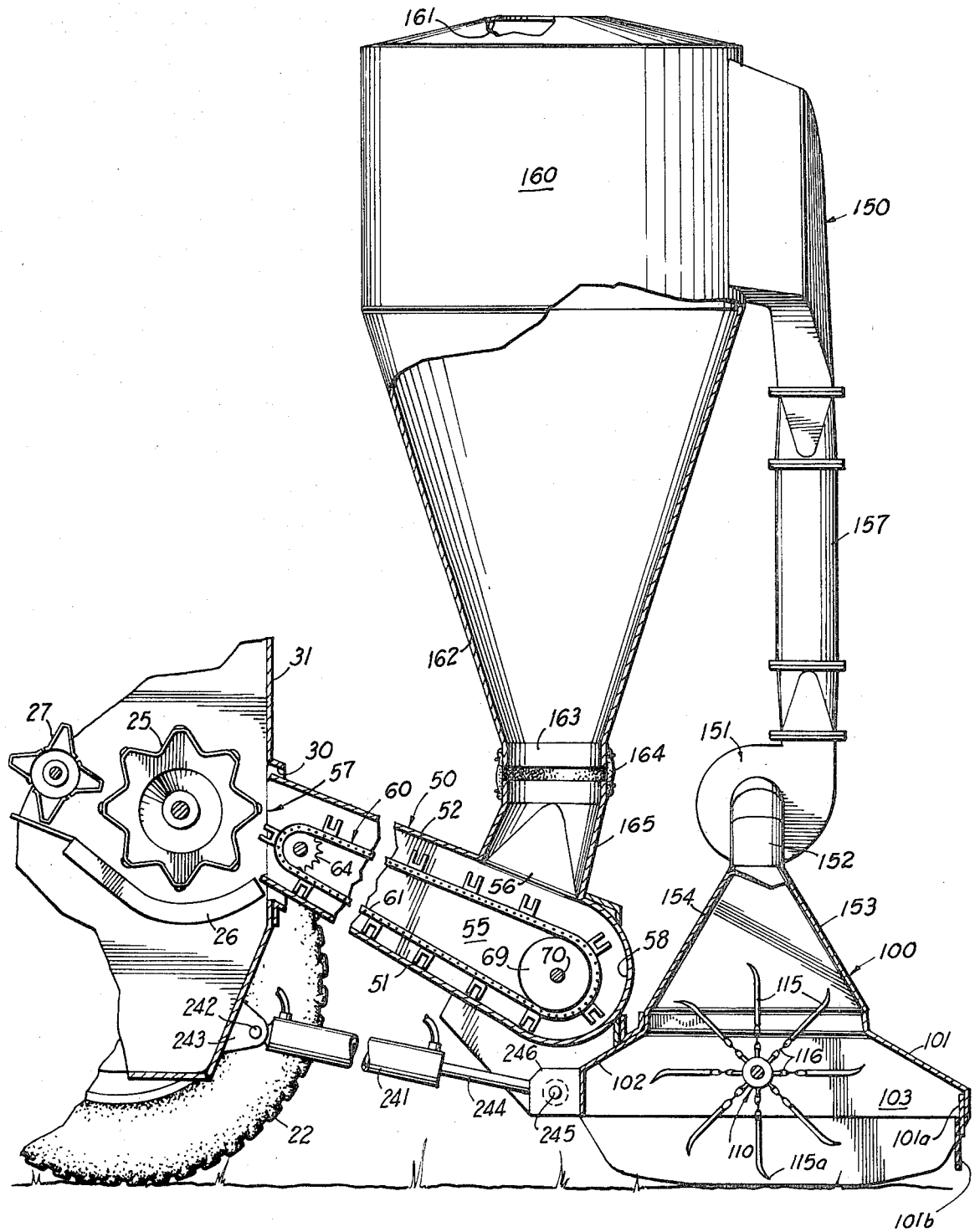
FIG. 2 is an enlarged fragmentary side elevational view as seen from the left of FIG. 1, with certain parts omitted and certain parts broken away and shown in section for purpose of clarity.
Figure 3:
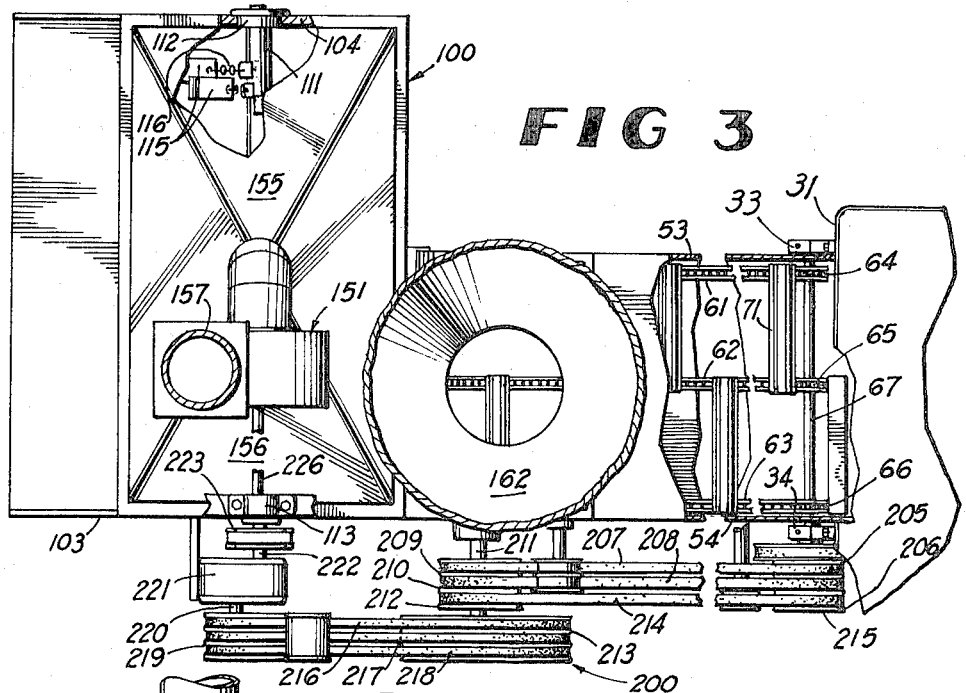
FIG. 3 is a top plan view of the seed harvesting attachment shown in FIG. 2, with certain parts omitted and certain parts broken away and shown in section for purpose of clarity; and, FIG. 4 is a fragmentary side elevational view of the seed harvesting attachment, as seen from the right of FIG. 1, with certain parts omitted and certain parts broken away and shown in section for purpose of clarity.

Referring now to the drawing, a seed harvesting attachment embodying the principles of the present invention is shown and generally represented by the reference numeral 10. Seed harvesting attachment 10 is adapted to be releasably connected to a conventional self-propelled combine 20. Combine 20 includes a pair of front drive wheels 21, 22 powered by a conventional motor means 23. Combine 20 also includes rear steerable wheels (not shown) which are controlled from an operator's platform 24. As shown in FIGS. 2 and 3, combine 20 is provided with a conventional threshing cylinder 25 operatively associated with a breast plate or concave 26 and includes rotary transfer means 27 operable for transferring the material being threshed rearwardly into conventional combine separating and cleaning mechanism (not shown).

Combine 20 is provided with an entrance opening 30 formed in a forward wall 31 adjacent threshing cylinder 25. As shown in FIG. 3, forward wall 31 of the self-propelled combine is provided with a pair of forwardly directed female mounting brackets 33,34, respectively. Mounting brackets 33, 34 are of conventional construction and are adapted to receive complementary male projections provided on header attachment 10, so that the header attachment can be releasably connected to the self-propelled combine 20.

The seed harvesting attachment will be described with reference to an upwardly inclined input feed conveyor means 50, crop gathering means 100, crop transfer means 150 and drive means 200. The function of the input feed conveyor means 50 is for receiving and transferring crops to be threshed into the combine opening 30, whereby the crop will be engaged by threshing cylinder 25 for removing the seed from the growing plant and for transferring the seeds and threshed crop to the conventional separating and cleaning mechanism.

The function of the crop gathering means 100 is to provide means for engaging and severing the crops in response to advancement of the combine and seed harvesting attachment over the ground in which the crop is being grown.

The function of the transfer means 150 is to provide means for transferring the crop to be threshed from the gathering means 100 to the input feed conveyor means 50.

Figure 4:
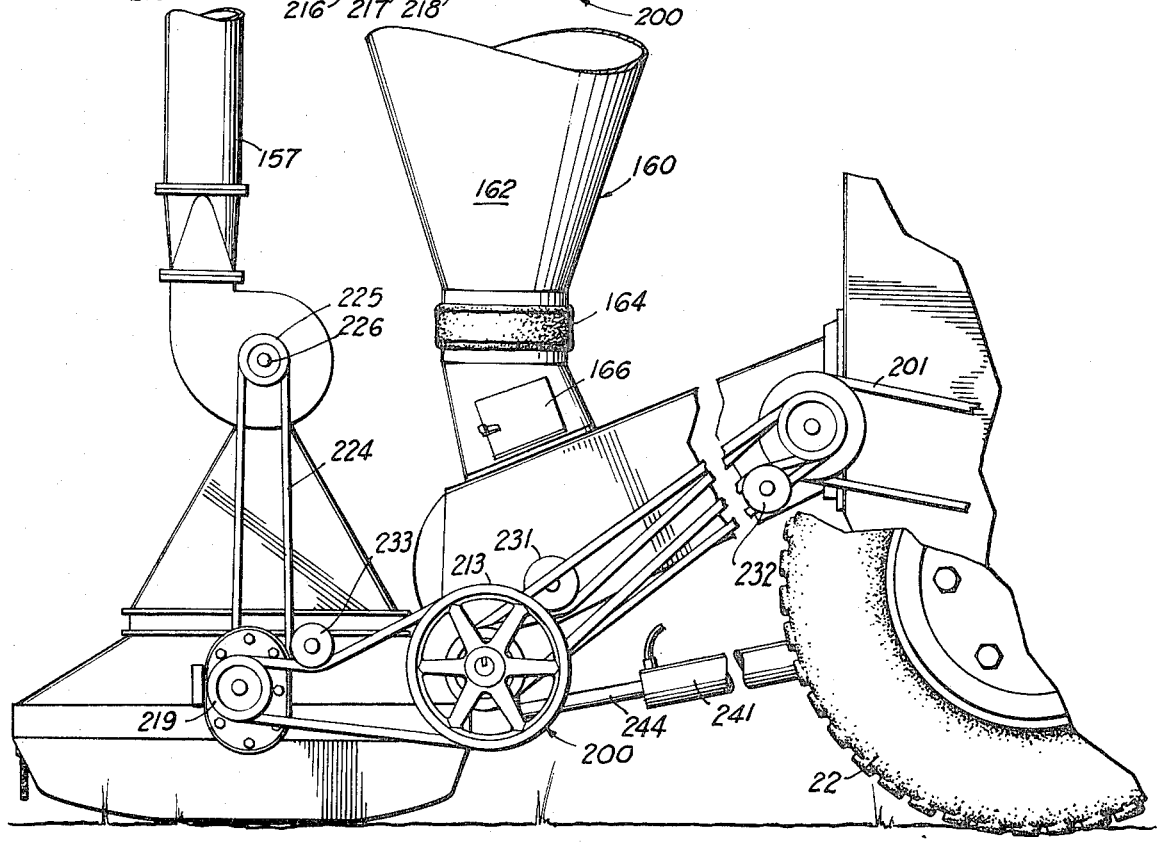

As shown in FIGS. 2–4, the input feed conveyor means is constructed of conventional metal stock material with the connections being made by welding or nut and bolt connecting means (not shown).

The input feed conveyor means includes a housing having a transversely extending upwardly inclined bottom 51 and a vertically spaced transversely extending upwardly inclined top 52, both of which are connected by a pair of vertical sidewalls 53, 54 for defining a conveying chamber 55 through which material is transferred by an endless conveying mechanism 60. As shown in FIG. 2, the conveyor housing 50 is provided with a closed arcuate-shaped front wall 58. The conveying housing 50 is provided with an entrance opening 56 through which material is introduced into the housing and is provided with an end discharge opening 57 which is connected in flow communication with opening 30 formed on the front wall 31 of the self-propelled combine.

The endless conveying mechanism 60 includes three parallel arranged endless chain members 61, 62, 63, as shown in FIG. 3. Endless chain members 61–63 are supported adjacent the discharge end 57 by complementary supporting sprockets 64, 65 and 66, respectively. Sprockets 64-66 are fixed to a cross-support shaft 67 which is rotatably mounted in the conveyor housing sidewalls 53,54 by conventional bearing means (not shown).

The opposite ends of endless chain 61–63 are supported adjacent arcuate shaped end wall 58 by means of a transversely extending roller 69. Roller 69 is fixed to shaft 70 which is supported in the conveyor housing sidewalls 53, 54 by conventional bearing means (not shown).

As shown in FIGS. 2 and 3, endless conveyor means 60 includes a plurality of transversely extending channel-shaped slat members 71. Slat members 71 are detailed in length to extend across two of the endless chain members 61–63, as shown in FIG. 3, with certain of the slat members 71 longitudinally staggered relative to the length of endless chain members.

In operation, material which has been gathered by the gathering means 100 is introduced into the conveyor housing 50 through entrance opening 56 and is allowed to drop onto the housing bottom 51. Endless conveyor 60 is driven in a clockwise direction, as shown in FIG. 2, by a belt and pulley drive means 205 which will be described in more detail hereinbelow. Clockwise movement of the endless conveyor 60 will cause the transversely extended conveyor slats 71 to engage material supported on housing bottom 51 and will advance the material upwardly along the inclined housing bottom for discharge through opening 57 to the combine threshing cylinder 25.

Figure 1:
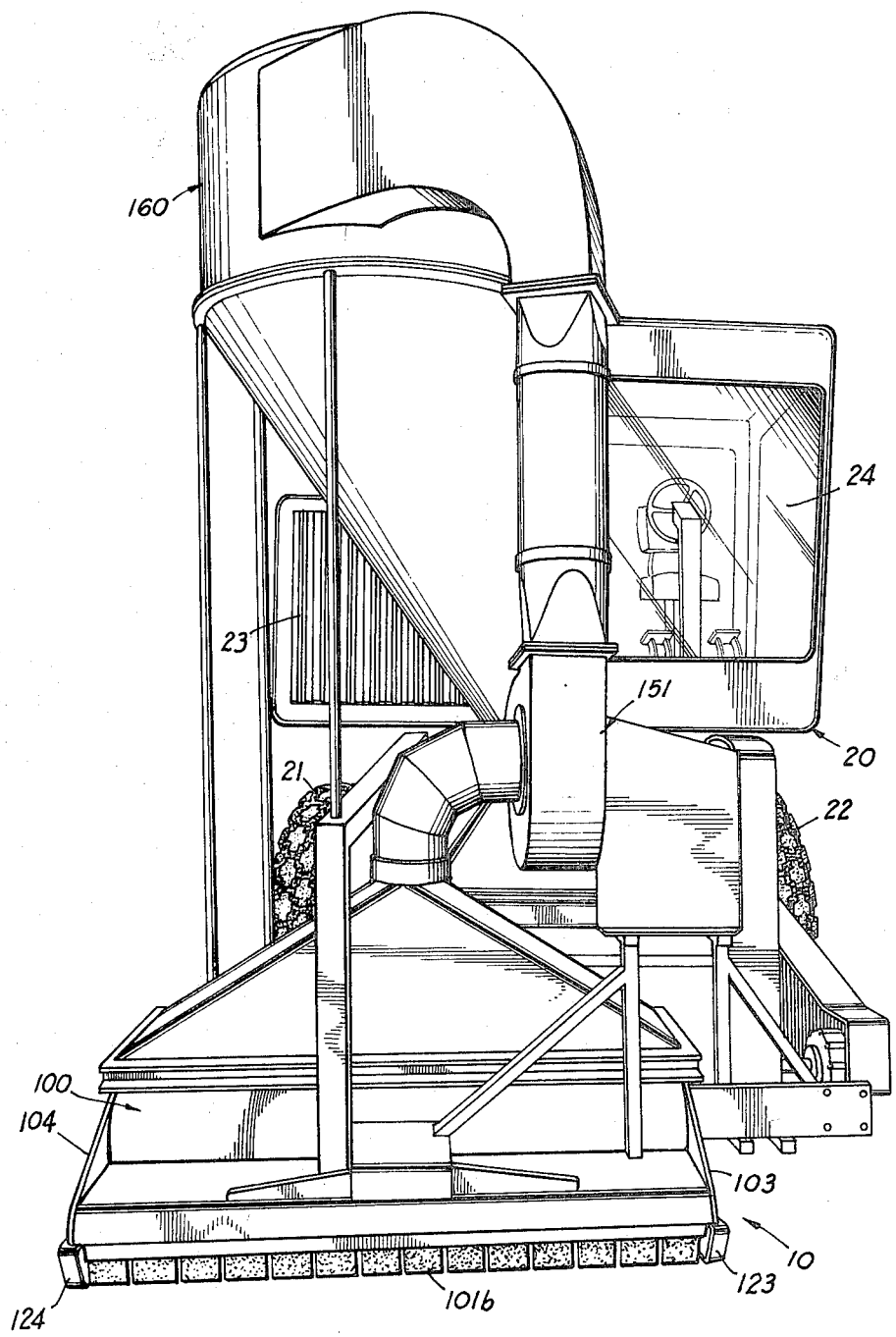
FIG. 1 is a front perspective view of a combine and seed harvesting attachment embodying the principles of the present invention.

As shown in FIGS. 1–2, the seed harvesting attachment gathering means 100 includes a transversely extending downwardly opened housing structure which is connected to the forward end of the input feed conveyor housing 50 by conventional metal stock connecting frame members which are joined by conventional welding means (not shown). The gathering housing is constructed to include a transversely extending upwardly inclined forward wall 101, a transversely extending upwardly inclined rear wall 102 and a pair of sidewalls 103, 104. The wall structures 101–104 are detailed to define a downwardly opened housing in which a rotary flail gathering mechanism 110 is supported. The rotary flail gathering mechanism 110 includes a transversely extended shaft 111 supported in sidewalls 103,104 by conventional support bearings 112, 113, as shown in FIG. 3. Flail gathering means 110 includes a plurality of flail gathering elements 115 which are connected by a flexible chain member 116 to connecting brackets 117 integrally formed with support shaft 111. Flail elements 115 and supporting mechanism are helically arranged axially along the length of shaft 111 whereby the flail elements will overlap each other to define a transverse severing distance extending throughout the width of the housing structure defined between sidewalls 103,104.

As shown in FIG. 1, gathering housing sidewalls 103,104 are provided with runners 123, 124, respectively, which are adapted to engage the ground over which a harvesting operation is being performed for maintaining the flail elements 115 at a predetermined elevation above the ground.

Housing front wall 101 includes a downwardly turned vertical wall portion 101a which is provided with a plurality of downwardly hanging flexible deflecting members 101b.

In operation, the flail gathering mechanism 110 is rotated in a counterclockwise direction as shown in FIG. 2 so that a leading sharpened edge 115a of each of the flail elements will engage the crop which is to be threshed, and will sever and elevate the crop upwardly for discharge through a discharge opening formed in the upwardly converging front and rear inclined walls 101, 102, respectively.

The crop being harvested is then transferred from the gathering means 100 to the input feed conveyor means 50 by means of pneumatic transfer means generally represented by the reference numeral 150. The pneumatic transfer means 150 includes a blower 151 having an intake conduit means 152. Intake conduit means 152 is connected in flow communication with downwardly open funnel-shaped housing structure designed by a pair of upwardly converging front and rear wall structures 153, 154, respectively, and a pair of upwardly converging sidewall structures 155, 156, respectively, as shown in FIG. 3. Blower means 151 is also provided with a discharge conduit means 157 connected in flow communication with a cyclone separator means 160. Cyclone separator means 160 is provided with an opening top 161 to permit air to be exhausted therefrom and is provided with a funnel-shaped downwardly converging wall structure 162 having a material discharge opening 163. Material discharge opening 163 is connected by a flexible coupling 164 to a discharge conduit means 165. Discharge conduit means 165 is connected in flow communication with entrance opening 56 formed in input feed conveyor housing top 52. As shown in FIG. 4, the discharge conduit 165 is provided with a removable closure panel 166 which will permit inspection and ready removal of material accumulated on the conveyor mechanisms 60, should the conveyor become clogged for any reason.

In operation, blower 151, including a plurality of blade elements (not shown), is rotated to develop a vacuum in intake conduit 152 whereby the crop severed and elevated by the rotary flail mechanism 110 will be transferred to the blower 151 for transfer through discharge conduit means 157 into the upper portion of cyclone separator 160. The crop being harvested will be separated from the air which will pass outwardly through opening 161, with the crop to be threshed falling by gravity through opening 163 and discharge conduit 165 into the conveyor housing entrance opening 56.

The endless conveyor 60, roller flail mechanism 110 and blower 151 are driven in a manner as indicated above by a belt and pulley drive means which is generally represented by the reference numeral 200. The belt and pulley drive means 200 include an input drive belt 201 connected in driving relationship with a drive pulley 202 rotatably supported on transversely extending conveyor shaft 67. An opposite end of drive belt 201 is connected in driving relationship with a drive pulley means (not shown) provided on the self-propelled combine 20, which will be effected in a conventional manner from the combine motor means 23.

As shown in FIGS. 3 and 4, a pair of transfer drive pulleys 205, 206 are rotatably supported on shaft 67 and are angularly fixed to drive pulley 203 so that rotation of pulley 203 will effect corresponding rotation of the transfer pulleys 205,206. Pulleys 205,206 are drivingly connected by belts 207, 208 to a pair of pulleys 209,210, respectively. Pulleys 209,210 are rotatably supported on a support shaft 211 supported on the conveyor housing sidewall 55.

Drive pulleys 209,210 are angularly fixed to a single belt supporting pulley 212 and to a plural belt supporting pulley 213. Single belt supporting pulley 212 is drivingly connected by a belt 214 to a pulley 215 fixed to an extended end of conveyor shaft 67. The plural belt supporting pulley 213 is drivingly connected by three belts 216, 217 and 218 to a second plural belt supporting pulley 219. Plural belt supporting pulley 219 is fixed to an input drive shaft 220 supported in a gear housing 221. Gear housing 221 is provided with an output drive shaft 222 axially aligned and connected with the flail gathering shaft 111.

As shown in FIGS. 3 and 4, pulley 223 is fixed to shaft 222 and includes a pair of drive belts 224 operatively connected to pulley 225 fixed to blower drive shaft 225 for effecting operation of blower 151.

As shown in FIG. 4, a first idler pulley 231 is supported by conventional adjustment mechanism (not shown) so that the idler pulley can be adjusted to maintain proper tension on drive belts 207,208. A second idler pulley 232 is supported in a conventional manner for adjusting the tension on belt 214. A third idler pulley 233 is provided for adjusting the tension on drive belt 217 and 218.

In operation, a drive from the self-propelled combine motor 23 is transferred through belt 201 to effect counterclockwise rotation of pulley 203. Counterclockwise rotation of pulley 203 will effect corresponding counterclockwise rotation of pulleys 205,206 which will rotate pulleys 209, 210 in a counterclockwise direction. The drive from pulleys 209,210 is then transferred through pulley 212, belt 214 back to pulley 215 for effecting a corresponding counterclockwise rotation of the conveyor drive shaft 67, as shown in FIG. 4, whereby the conveyor will be advanced so that the bottom run of the conveyor will advance the conveyor slats 71 upwardly along the inclined bottom 51 for transferring material to be threshed into the combine opening 30.

Since the plural belt supporting pulley 213 is fixed to pulleys 209, 210, rotation of pulleys 209,210 in a counterclockwise direction, as shown in FIG. 4, will effect a corresponding counterclockwise rotation of plural belt supporting pulley 219. Gear box housing 221 is detailed in operation to effect a clockwise rotation of output drive shaft 222 in response to a counterclockwise rotation of input drive shaft 221. A clockwise rotation of output drive shaft 221 will effect a clockwise rotation of the flailing gathering assembly 110 and blower means 151, as shown in FIG. 4.

As shown in FIGS. 2 and 4, the seed harvest attachment 10 is adapted to be adjusted in a vertical plane about the axis of shaft 67 by means of a pair of conventional hydraulic cylinder means 241 (only one of which is shown in the drawings). The base end of cylinder 241 is pivotally connected at 242 to a mounting bracket 243 provided on the front of the combine housing structure. The extended end of piston rod 244 is pivotally connected at 245 to a mounting bracket 246 provided on the seed harvest attachment 10. In operation of the cylinders 241, the piston rods 244 will be extended to effect vertical adjustment of seed harvest attachment 10 in a vertical plane about the axis of the conveyor drive shaft 67.

In operation, the self-propelled combine 20 is advanced over the terrain in which a seed harvesting operation is to be performed with the drive means 200 being operated and with the gathering means 100 adjusted to a position whereby the rotary flail gathering elements 115 will contact the crop to be harvested adjacent the ground and will sever the crop in response to the forward advancement of the seed harvesting attachment and combine. After the crop has been severed by the flail severing means 110, the crop is elevated and discharged by pneumatic conveying means 150, including blower 151 to the cyclone separator means 160. The material is then separated from the air and allowed to drop by gravity through entrance opening 56 into the infeed conveyor housing 50. Endless conveyor 60 will then advance the crop upwardly along the inclined bottom 51 for discharge through opening 30 to the combine threshing cylinder 25. After the crop enters the combine, the crop will be subjected to threshing action performed by cylinder 25, with the crop and seeds being advanced to the combine separating and cleaning mechanisms in a conventional manner.

The seed harvesting attachment 10 can be readily removed from the combine 20 by disconnecting the mounting bracket 33, 34 and disconnecting the drive belt 201.

It now becomes apparent that the above described illustrative embodiment of the seed harvesting attachment is capable of obtaining the above stated objects and advantages. It is obvious that those skilled in the art may make modifications in the details of construction without departing from the spirit of the invention which is to be limited only by the scope of the appended claims.

What is claimed is:

1. A harvesting attachment for a combine having threshing means comprising input feed means including an endless conveyor adapted to be supported in transfer communication with combine threshing means for transferring material to be threshed thereto, gathering means for harvesting a crop including means for advancing such crop to an elevated position, pneumatic means for transferring the harvested crop from the gathering means, a separator receiving such crop from said pneumatic means and adapted to separate the air from the crop, and means for delivering the separated crop to said endless conveyor.

2. An attachment as in claim 1 wherein said separator is a cyclone separator.

3. An attachment as in claim 2 wherein said separator comprises a cylindrical member and a frusto-conical member coaxial therewith, said members having a common vertical axis, and said pneumatic means comprises a blower mounted adjacent the bottom of said frusto-conical member, and a vertical pipe connecting said blower with said cylindrical member.

4. An attachment as in claim 3 wherein said frusto-conical member tapers downwardly and communicates at its lower end with the upper run of said endless conveyor.

5. An attachment as in claim 1 including means for mounting the attachment pivotally on a combine and further including hydraulic piston and cylinder means pivotally connected at one end to said attachment and adapted to be pivotally connected to a combine whereby movement of said piston means will adjust the attachment vertically.

6. An attachment as in claim 1 wherein said endless conveyor passes around two horizontal shafts, one of said shafts being provided with sprocket means which engage and drive the conveyor and wherein said one shaft carries a pulley adapted to be connected by a belt with drive means on a combine.

7. An attachment as in claim 6 wherein said one shaft of said endless conveyor has driving connections with said pneumatic means and said gathering means.

8. An attachment as in claim 7 further including means for pivotally mounting the attachment on a combine for movement about the axis of said one shaft of the endless conveyor, and wherein said attachment is further provided with hydraulic cylinder and piston means pivoted to said attachment and adapted to be pivotally connected to a combine for moving said attachment about said pivotal mounting.

9. A harvesting attachment as defined in claim 1 further characterized in that said gathering means includes a rotary flail means having a plurality of pivotally mounted flail elements, each flail element having a sharpened cutting edge, and wherein said flail elements are power driven so as to sever a crop in response to being advanced into contact with a crop and wherein said flail means is operable for advancing said severed crop to an elevated discharge position.

10. A harvesting attachment as defined in claim 1 further characterized in that said attachment is adapted to be pivotally supported on a combine and includes means for effecting vertical adjustment of said attachment in a vertical plane at any level between the ground and transport position.

* * * * *